US009311307B2

(12) United States Patent
Kelly et al.

(10) Patent No.: US 9,311,307 B2
(45) Date of Patent: Apr. 12, 2016

(54) CONTEXT SENSITIVE ENTRY POINTS

(75) Inventors: Sean Kelly, Cupertino, CA (US);
Thomas Matthieu Alsina, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 13/153,249

(22) Filed: Jun. 3, 2011

(65) Prior Publication Data

US 2012/0310783 A1  Dec. 6, 2012

(51) Int. Cl.
*G06F 17/30* (2006.01)

(52) U.S. Cl.
CPC ............................... *G06F 17/30029* (2013.01)

(58) Field of Classification Search
None
See application file for complete search history.

(56) References Cited

U.S. PATENT DOCUMENTS

| 7,672,873 | B2 | 3/2010 | Kindig et al. | |
|---|---|---|---|---|
| 2003/0182139 | A1* | 9/2003 | Harris et al. | 705/1 |
| 2006/0206428 | A1* | 9/2006 | Vidos et al. | 705/50 |
| 2006/0206799 | A1 | 9/2006 | Vidos et al. | |
| 2006/0259355 | A1 | 11/2006 | Farouki et al. | |
| 2006/0259930 | A1 | 11/2006 | Rothschild | |
| 2007/0177586 | A1* | 8/2007 | Eyal et al. | 370/352 |
| 2008/0270903 | A1 | 10/2008 | Trahan et al. | |
| 2008/0288328 | A1* | 11/2008 | Minor et al. | 705/10 |
| 2009/0271283 | A1* | 10/2009 | Fosnacht et al. | 705/26 |
| 2010/0057779 | A1 | 3/2010 | Pan | |
| 2012/0059847 | A1* | 3/2012 | Yang | 707/770 |
| 2012/0072314 | A1* | 3/2012 | Schory et al. | 705/27.2 |
| 2012/0084731 | A1* | 4/2012 | Filman et al. | 715/838 |
| 2012/0221724 | A1* | 8/2012 | Chor | 709/225 |

OTHER PUBLICATIONS

Olson, C. A. (1998). Software aims to personalize net retailing. Billboard, 110(13), 43-43, 45. Retrieved from http://search.proquest.com/docview/227091498?accountid=14753.*
"International Search Report", PCT/US2012/036019 8802.255.PCT000, Jun. 21, 2012, 3 pages.
International Search Report and Written Opinion from PCT Application No. PCT/US2012/036019 issued Jun. 21, 2012.
International Preliminary Report on Patentability from PCT Application No. PCT/US2012/036019 issued Dec. 4, 2013.

* cited by examiner

*Primary Examiner* — Kathleen Palavecino
(74) *Attorney, Agent, or Firm* — Polsinelli LLP (57) ABSTRACT

Various methods for opening an online media store are disclosed. In one aspect, a media player can determine contextual data (e.g., category information, performer information, genre associated with the media, etc.) associated with the media selected or displayed by a user of the media player. The media player can provide the contextual data to an online media store. The online media store can be opened to a context sensitive entry point based on the contextual data. In some implementations, the context sensitive entry point can display content associated with the category of the media previously displayed by the media player.

18 Claims, 5 Drawing Sheets

CONTEXT SENSITIVE ENTRY POINTS

TECHNICAL FIELD

This disclosure relates generally to context sensitive entry points for online stores.

BACKGROUND

Modern media player applications provide graphical user interfaces for browsing, selecting, accessing or playing media content, such as music, video, audiobooks, electronic books, ringtones and applications. In addition, media players can be connected to an online media store that can be opened from the media player.

SUMMARY

Various methods for launching an online media store are disclosed. In one aspect, an application (e.g., a media player) can determine contextual data associated with the media selected or displayed by a user of the media player (e.g., category information, performer information, genre associated with the media, etc.). The media player can provide the contextual data to an online media store. The online media store can be opened to a context sensitive entry point based on the contextual data. In some implementations, the context sensitive entry point can display content associated with the category of the media previously displayed by the media player.

Particular implementations of the context sensitive entry points, provides one or more of the following advantages. Context sensitive entry points can enable a user of an online media store to quickly navigate to the user's desired content or content in which the user likely has interest.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference symbols in the various drawings indicate like elements.

DETAILED DESCRIPTION

Exemplary Media Content Views

Figure 1:
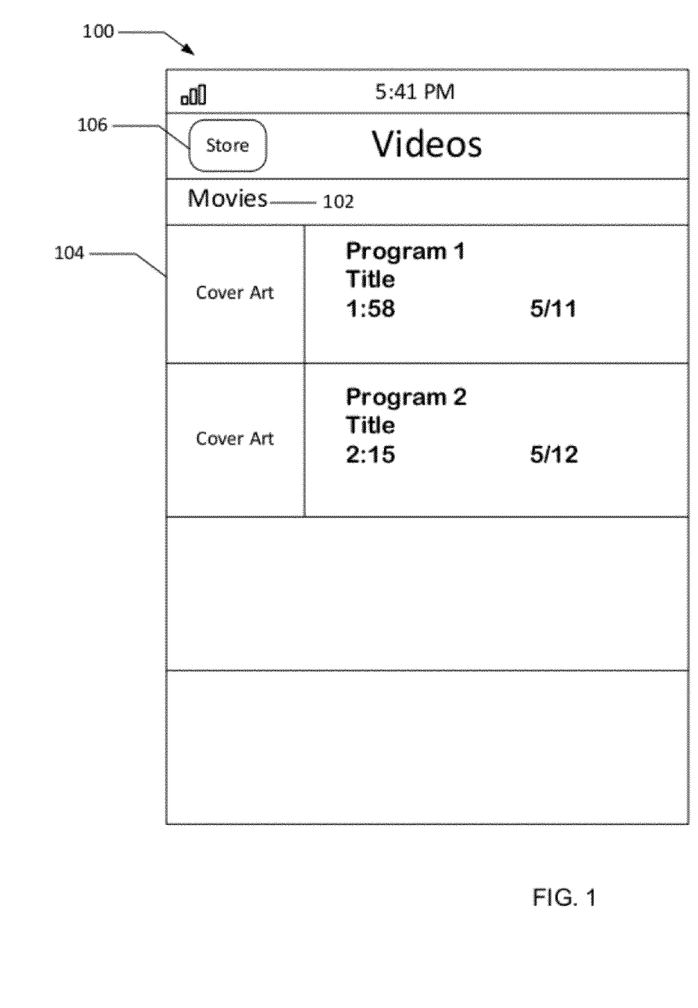
FIG. 1 is an exemplary graphical user interface for opening an online media store using context sensitive entry points.

FIG. 1 illustrates an example graphical user interface associated with a media player 100. The media player 100 can be a software application that can store and play various types of media content. For example, the media player 100 can store and play audio files (e.g., songs, podcasts, ring tones, etc.) and multimedia content (e.g. movies, television shows, music videos, etc.). In some implementations, the media player 100 can store the audio and multimedia content on a server and access the server to play or display the audio and multimedia content. In some implementations, the media player 100 can display electronic books and magazines (collectively referred to as "ebooks"). The media player 100 can be executed on various types of computing devices. For example, the media player 100 can be executed on a desktop computer, a laptop computer, a tablet computer, or a smart phone.

The media player 100 can provide a graphical interface that includes a category indicator 102, media content information 104 and an interface element 106 to open an online media store that is coupled to the media player 100 through a network. The category indicator 102 allows a user of the media player 100 to quickly determine the category or type associated with the displayed media content information 104 (e.g., the media content being played by the media player 100, the media content that has been selected by the user, the media content information being browsed by the user, etc.). The category indicator 102 can be a text-based descriptor or a graphical descriptor that indicates the category or type of the displayed media content. For example, as seen in FIG. 1, the category indicator 102 is a text-based descriptor that indicates that the displayed media content is a movie. Other example categories or types associated with displayed media content can include music, podcasts, ring tones, television shows, music videos or applications.

The media content information 104 can be associated with any type of media content that can be played or displayed by the media player 100. For example, the media content information 104 can be associated with a song, a ring tone, a podcast, an ebook, a movie, a television show or a music video. The media player 100 can display information associated with the media content 104. The media content information 104 can include various types of information. For example, the media content information 104 can include an image based representation of the media content 104 (e.g., cover art, movie art or an icon) that can be displayed by the media player 100. In addition, the media content information 104 can include metadata describing the media content. For example, the metadata can include category information associated with the media content, the title associated with the media content, artist information (e.g., a performer's name, a composer's name, an author's name) associated with the media content, the title of the media content (e.g., a song name or an episode name) and the length of the media.

The interface element 106 can open or launch the online media store. For example, after a user selects the interface element 106 (e.g., a selectable button), the online media store can be opened or launched from the media player 100. The online media store (e.g., the online media store 200 illustrated in FIG. 2) can be a software application separate from the media player. In some implementations, the online media store is a separate application running on a server in a network and coupled or linked to the media player 100. In some implementations, the online media store is integrated with the media player 100. Although FIG. 1 illustrates the interface element 106 as a button, other graphical interface elements can be used. For example, a gesture, such as a left-to-right finger swipe or mouse movement, can also be used as an implementation of the interface element 106.

The media player 100 can open or launch the online media store to the context sensitive entry point by exchanging information, such as key/value pairs and header information that includes the contextual data associated with the media content displayed by the media player (e.g., the category associated with the category indicator 102), with the online media store. For example, the media player 100 can provide HTTP header information, such as a store front header, to the online media store and/or server and request key/value pair information from the online media store. In response, the online media store and/or server can provide key/value pair information to the media player 100. The key/value pair information can be used to open the online media store to the appropriate context sensitive entry point. Example key/value pairs include key/value pairs for various parameters used by the online media store, such as entry points to the store, localization information and default appearance parameters. The key/value pairs can be used to open the online media store to the appropriate entry point. In some implementations, the media player 100 and the online media store use URLs or URIs to exchange key/value pair information and header information.

Figure 2:
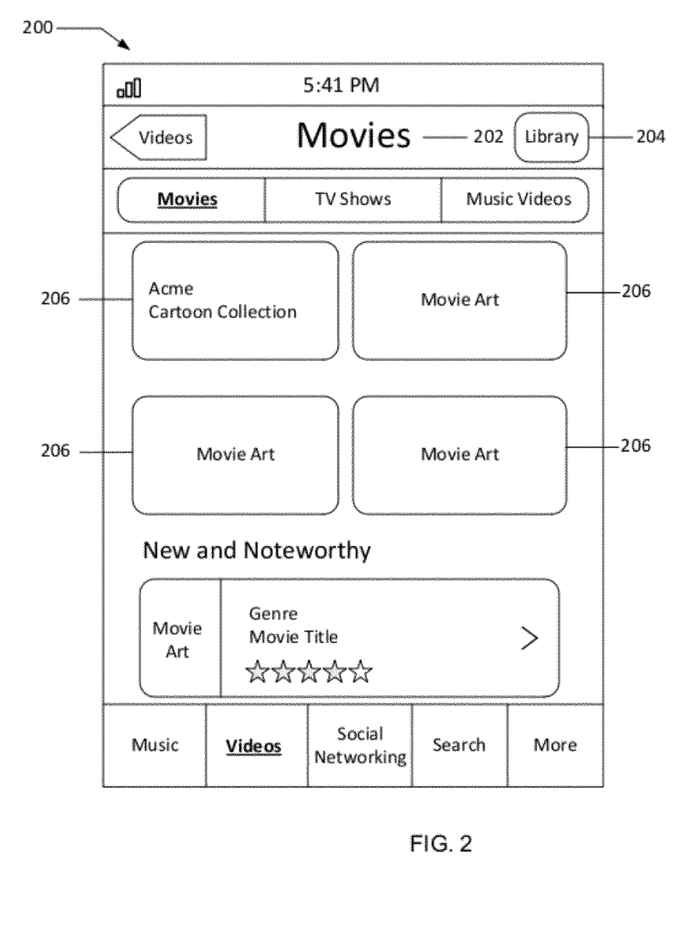
FIG. 2 is exemplary context sensitive entry point of an online media store.

FIG. 2 illustrates an example context sensitive entry point of an online media store 200. As described above, the online media store 200 can be a software application that can be launched from the media player 100. The online media store 200 can allow a user to purchase various media content. For example, a user can purchase music, podcasts, ring tones, movies, television shows, music videos, ebooks and software applications from the online media store 200. In some implementations, the user can rent the media content for a predetermined time period or a predetermined number of views. The online media store 200 can include a category indicator 202, media content information 204, and a navigation control 206.

Similar to the media player's category indicator 102, the category indicator 202 can be a text-based or graphic-based descriptor that indicates the category or type of media content displayed by the online media store 200. For example, as seen in FIG. 2, the category indicator 202 indicates that media content information 204 displayed by the online media store 200 is associated with the movie category. The category indicator 202 can allow the user to quickly determine the category of media content that is displayed by the online media store 200. The category information displayed by the category indicator 202 can be provided by the media player 100 and can be the same as or substantially similar to the category indicator 102 displayed by the media player 100. For example, the media player 100 can determine the category or type of media associated with the media content being played or selected by the user of the media player 100 and provide the category information to the online media store 200.

The media content information 204 can be associated with various content items associated with the category indicator 202. For example, the media content information 204 included on the context sensitive entry point can be associated with the same category as indicated by the category indicator 202. For example, as seen in FIG. 2, because the category indicator 202 is equal to movies, the media content information 204 are associated with movies that can be purchased from the online media store 200. The media content information 204 can include graphical representations of the media content 204. For example, the media content information 204 can include cover art or other artwork associated with the media content. In some implementations, the media content information 204 can include a link to a portion of the online media store 200 where the media content can be purchased. For example, a user can select a media content information 204 to open an area of the online media store that allows the user to purchase the selected media content 204. In some implementations, the media content information 204 can include media content information associated with media content selected for the user by the online media store 200 based on previously collected user data (e.g., the user's purchase history, similarities or sales correlation between the user and other users, other sales information, etc.). For example, the online media store 200 can display media content information 204 associated with media content in which the user might have an interest.

The navigation control 206 can be a graphical interface element (e.g., a button) that allows the user to return to the media player 100. For example, the user can select or otherwise interact with the navigation control 206 to return to the media player 100. The navigation button 206 can return the user to the specific page or media content 100 that was being displayed when the online media store 200 was opened or launched. Although FIG. 2 illustrates the navigation control 206 as a button, other graphical interface elements can be used. For example, a gesture, such as a right-to-left finger swipe or mouse movement, can also be used as an implementation of the navigation control 206.

Exemplary Process

Figure 3:
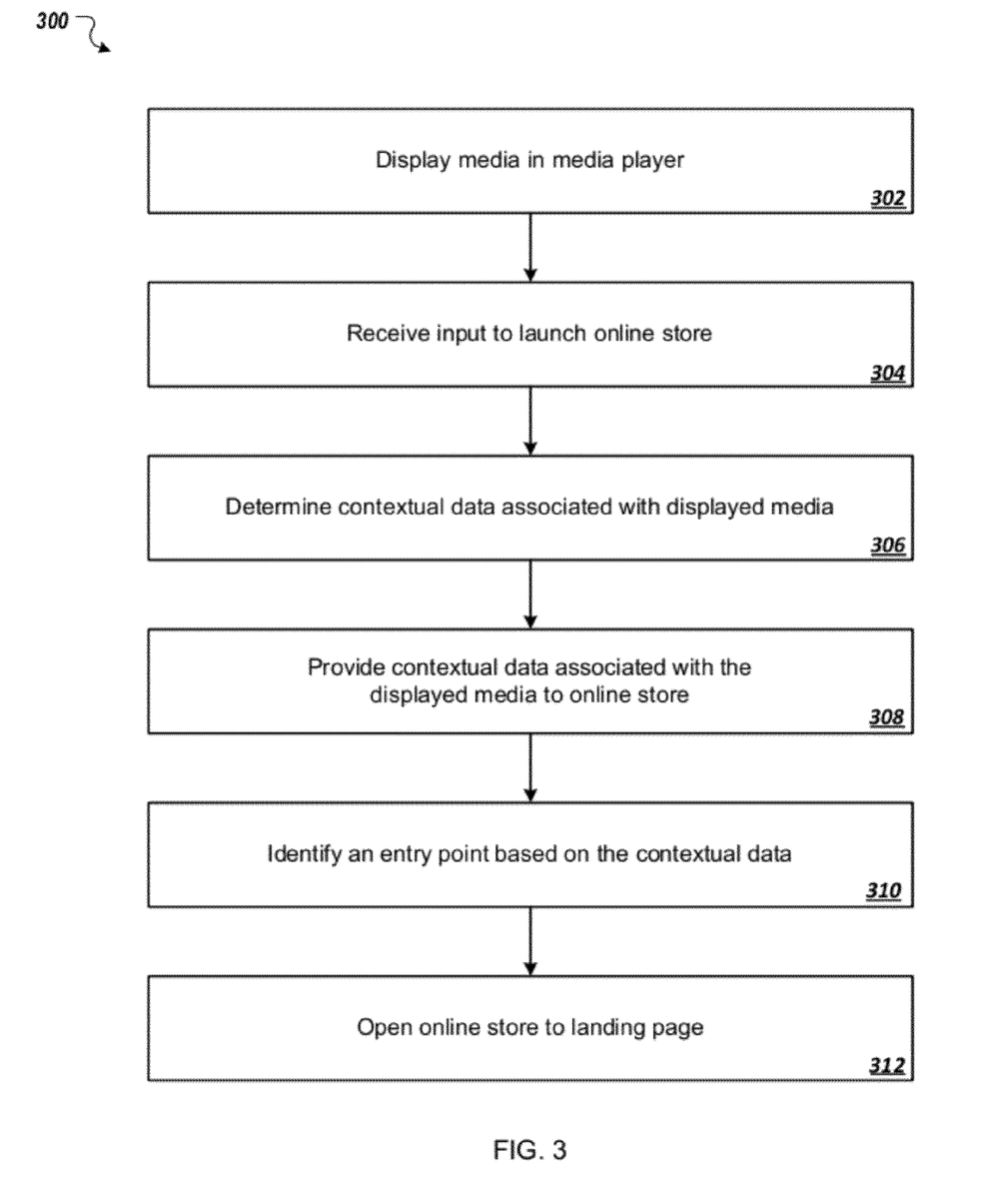
FIG. 3 is a flow diagram of an exemplary process for opening an online media store using context sensitive entry points.

FIG. 3 is a flow diagram of an exemplary process 300 for opening an online media store using context sensitive entry points Exemplary process 300 can begin by displaying media content information 104 in the media player (at 302). For example, a user of media player 100 can play media content, browse media content or select media content (all referred to as "displayed media content"). The media player 100 can display media content information 104, such as cover art and performer information associated with the media content.

Process 300 can continue by receiving an instruction to launch the online media store (at 302). For example, the user of the media player 100 can select the interface element 106 to launch the online media store 200.

Process 300 can continue by determining contextual data associated with the displayed media content (at 306). For example, the media player 100 can determine the contextual data associated with the displayed media content. In some implementations, the media player 100 determines the contextual data by analyzing metadata associated with the media content. The metadata can include information that is displayed by the media player 100 and information that is not displayed by the media player 100. The contextual data can include various types of information related to the displayed media content. For example, the contextual data can include category information related to the media content (e.g., movies, tv show, music videos, music, podcasts, ebooks, etc.), artist information (e.g., information related to the performer or artist), information related to the title of the media content, information related to the collections of work that includes the media content (e.g., album name, television show name, podcast name, etc.).

Process 300 can continue by transmitting or providing the contextual data to the online media store 200. For example, the media player 100 can provide or transmit the contextual data associated with the displayed media content to the online media store 200.

Process 300 can continue by identifying an entry point for the online media store based on the contextual data (at 310). For example, the media player 100 can provide the contextual data to the online media store 200 using an HTTP header that includes the contextual data and the online media store 200 can analyze the contextual data and determine an appropriate entry point for the user. In some implementations, the online media store 200 determines the appropriate entry point based on the category/type information associated with the media content that was selected or played at the time the instruction to launch the online media store was received. In some implementations, the online media store 200 determines the appropriate entry point based on other contextual data, such as information related to the performer's name or information related to the collection work that includes the media content. The online media store 200 can provide the entry point information to the media player 100 using key/value pairs.

Process 300 can continue by launching the online media store using the information included in the key/value pairs and displaying the appropriate entry point (at 312). For example, the online media store 200 can be launched such that the user is taken directly to a portion of the online media store 200 that includes media content information 204 associated with the same category or type (e.g., movies). As seen in FIGS. 1 and 2, the online media store 200 can be launched such that a portion of the online media store 200 associated with movies is displayed, which is the category associated with the media content information 104 displayed by the media player 100. In some implementations, the online media store can be launched such that the user is taken directly to a portion of the online media store 200 that includes media content information 204 associated with the performer or artist associated with the media content 104.

Exemplary Operating Environment

Figure 4:
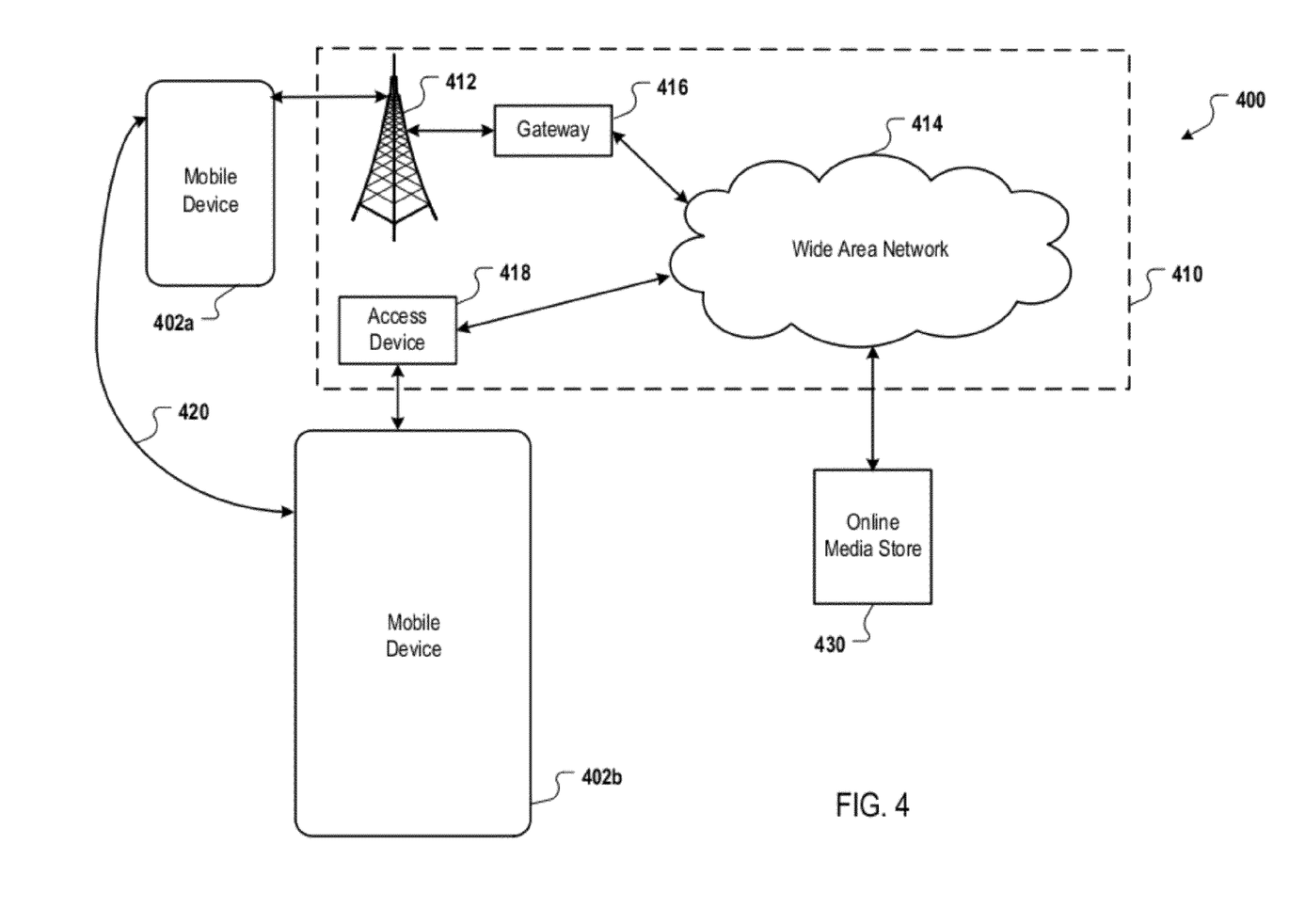
FIG. 4 is a block diagram of an exemplary operating environment for a mobile device capable of viewing media item representations.

FIG. 4 is a block diagram of an exemplary operating environment for a mobile device capable of viewing media content. Mobile devices 402a and 402b can communicate over one or more wired or wireless networks 410. For example, a wireless network 412 (e.g., a cellular network) can communicate with wide area network (WAN) 414, such as the Internet, by use of gateway 416. Likewise, access device 418, such as an 802.11g wireless access device (e.g., a router), can provide communication access to WAN 414.

In some implementations, both voice and data communications can be established over wireless network 412 and access device 418. For example, mobile device 402a can place and receive phone calls (e.g., using voice over Internet Protocol (VoIP)), send and receive e-mail messages (e.g., using Post Office Protocol 3 (POP3)), and retrieve electronic documents or streams, such as Web pages, photographs, and videos, over wireless network 412, gateway 416, and WAN 414 (e.g., using Transmission Control Protocol/Internet Protocol (TCP/IP) or User Datagram Protocol (UDP)). Likewise, in some implementations, mobile device 402b can place and receive phone calls, send and receive e-mail messages, and retrieve electronic documents over access device 418 and WAN 414. In some implementations, mobile device 402a or 402b can be physically connected to access device 418 using one or more cables and access device 418 can be a personal computer. In this configuration, mobile device 402a or 402b can be referred to as a "tethered" device.

Mobile devices 402a and 402b can also establish communications by other means. For example, mobile device 402a can communicate with other wireless devices, e.g., other mobile devices, cell phones, etc., over wireless network 412. Likewise, mobile devices 402a and 402b can establish peer-to-peer communications 420, e.g., a personal area network (PAN), by use of one or more communication technologies, such as Bluetooth™. Other communication protocols and topologies can also be implemented.

Mobile device 402a or 402b can communicate with one or more services over the one or more wired or wireless networks 412. For example, one or more online media stores or services 430 can provide a marketplace for users to purchase and download or stream media, such as music, video, applications, ringtones, audio books, electronic books and the like.

Mobile device 402a or 402b can also access other data and content over the one or more wired and/or wireless networks 412. For example, content publishers, such as news sites, Rally Simple Syndication (RSS) feeds, web sites, blogs, social networking sites, developer networks, etc., can be accessed by mobile device 402a or 402b. Such access can be provided by invocation of a web browsing function or application (e.g., a browser) in response to a user touching, for example, a Web display object on a screen of mobile device 402a or 402b.

Exemplary Device Architecture

Figure 5:
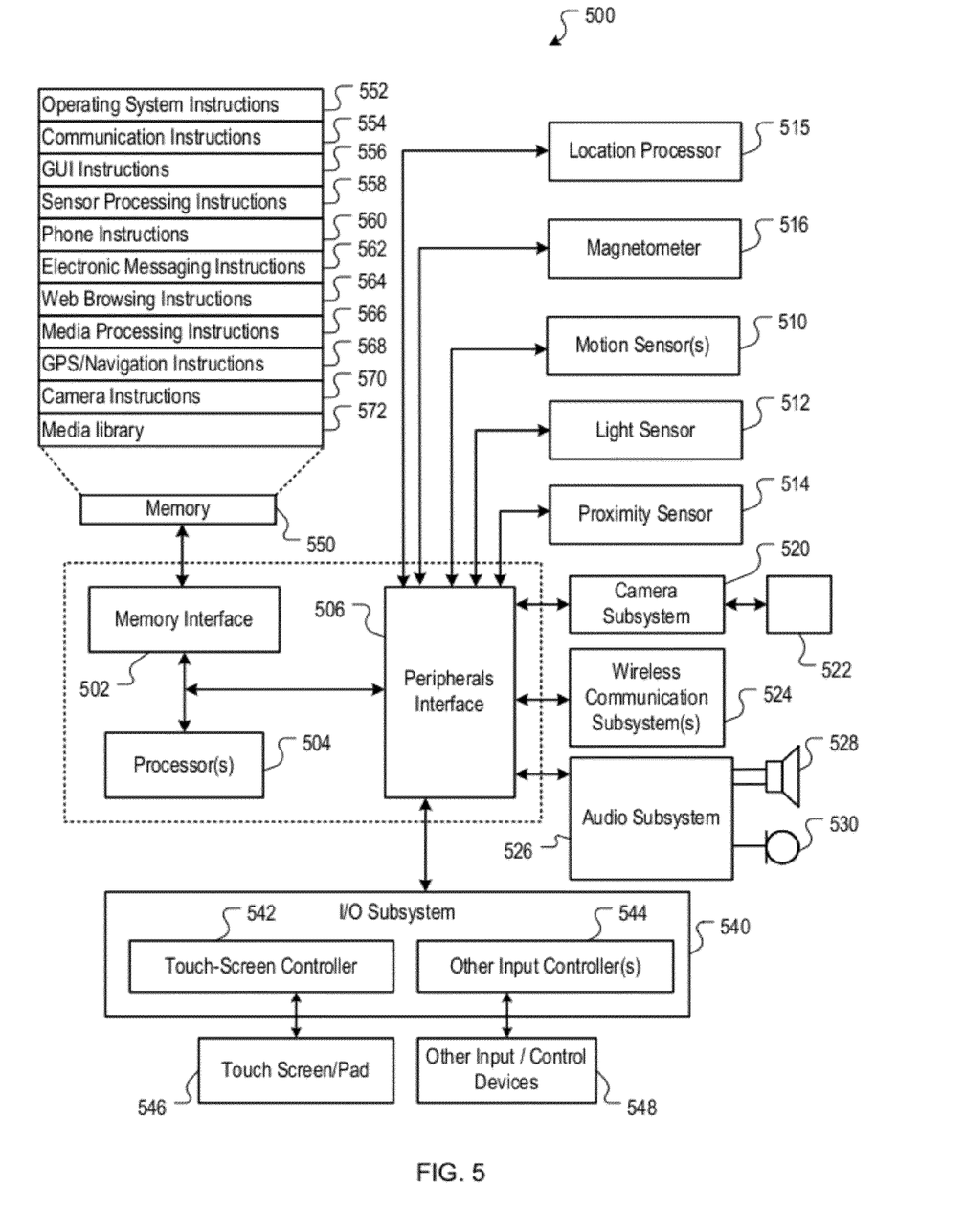
FIG. 5 is a block diagram of an exemplary device architecture that implements the features and processes described with reference to FIGS. 1-4.

FIG. 5 is a block diagram illustrating exemplary device architecture implementing features and operations described in reference to FIGS. 1-4. Device 500 can be any device capable of capturing handwriting on a touch sensitive surface, including but not limited to smart phones and electronic tablets. Device 500 can include memory interface 502, one or more data processors, image processors or central processing units 504, and peripherals interface 506. Memory interface 502, processor(s) 504 or peripherals interface 506 can be separate components or can be integrated in one or more integrated circuits. The various components can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the mobile device. For example, in some implementations, light sensor 512 can be utilized to facilitate adjusting the brightness of touch screen 546. In some implementations, motion sensor 510 (e.g., an accelerometer, gyros) can be utilized to detect movement and orientation of the device 500. Accordingly, display objects or media can be presented according to a detected orientation, e.g., portrait or landscape.

Other sensors can also be connected to peripherals interface 506, such as a temperature sensor, a biometric sensor, or other sensing device, to facilitate related functionalities.

Location processor 515 (e.g., GPS receiver) can be connected to peripherals interface 506 to provide geo-positioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 524. Communication subsystem(s) 524 can include one or more wireless communication subsystems. Wireless communication subsystems 524 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 524 can depend on the communication network(s) or medium(s) over which device 500 is intended to operate. For example, a mobile device can include communication subsystems 524 designed to operate over a GSM network, a GPRS network, an EDGE network, a WiFi or WiMax network, and a Bluetooth network. In particular, the wireless communication subsystems 524 can include For example, device 500 may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 524 may include hosting protocols such that the mobile device 500 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 526 can be coupled to a speaker 528 and one or more microphones 530 to facilitate voice-enabled functions, such as voice recognition, voice replication, digital recording, and telephony functions.

I/O subsystem 540 can include touch screen controller 542 and/or other input controller(s) 544. Touch-screen controller 542 can be coupled to a touch screen 546 or pad. Touch screen 546 and touch screen controller 542 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 546.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In one implementation, a pressing of the button for a first duration may disengage a lock of the touch screen 546; and a pressing of the button for a second duration that is longer than the first duration may turn power to mobile device 500 on or off. The user may be able to customize a functionality of one or more of the buttons. The touch screen 546 can also be used to implement virtual or soft buttons and/or a keyboard.

In some implementations, device 500 can present recorded audio and/or video files, such as MP3, AAC, and MPEG files. In some implementations, device 500 can include the functionality of an MP3 player and may include a pin connector for tethering to other devices. Other input/output and control devices can be used.

Memory interface 502 can be coupled to memory 550. Memory 550 can include high-speed random access memory or non-volatile memory, such as one or more magnetic disk storage devices, one or more optical storage devices, or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers or one or more servers. Communication instructions 554 can also be used to select an operational mode or communication medium for use by the device, based on a geographic location (obtained by the GPS/Navigation instructions 568) of the device. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and instructions; camera instructions 570 to facilitate camera-related processes and functions; media player application instructions 572 for implementing the processes and features described with reference to FIGS. 1-4. The memory 550 may also store other software instructions for facilitating other processes, features and applications.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to, communicate with, one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a player, the features can be implemented on a computer having a display device, such as a CRT (cathode ray tube) or LCD (liquid crystal display) monitor for displaying information to the player. The computer can also have a keyboard and a pointing device such as a game controller, mouse or a trackball by which the player can provide input to the computer.

The features can be implemented in a computer system that includes a back-end component, such as a data server, that includes a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks include LAN, WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A computer implemented method comprising:
receiving, by an online store, an indication that a client device received an instruction to launch an online store application from a media player application;
automatically receiving, by the online store, contextual data from the media player application, wherein the contextual data includes category information associated with media content currently being outputted by the media player application;
automatically identifying, by the online store and based on the contextual data, a store entry point identifier;
providing, by the online store, the store entry point identifier to the client device,
wherein the store entry point identifier comprises information for allowing the client device to navigate to a context-based entry point to the online store from the media player application; and
causing the client device to navigate to the context-based entry point to the online store from the media application player.

2. The computer-implemented method of claim 1 wherein the contextual data includes category information indicating media content displayed on the media player.

3. The computer-implemented method of claim 1 wherein the media content comprises at least one of music content; movie content, television show content and music video content.

4. The computer-implemented method of claim 1 wherein the contextual data includes artist information.

5. The computer-implemented method of claim 4 wherein the store entry point identifier links to media content associated with the artist information.

6. The computer-implemented method of claim 1 wherein the context-based entry point includes a link to return to the media player.

7. The computer-implemented method of claim 1 wherein the category information associated with the media content is substantially similar to the category information associated with the media displayed by the media player.

8. The computer-implemented method of claim 1 wherein the category information is derived from metadata associated with the media displayed by the media player.

9. The computer-implemented method of claim 1 wherein the store entry point identifier is included in an HTTP header.

10. The computer-implemented method of claim 1, wherein the store entry point identifier includes key/value pair information associated with the context-based entry point.

11. A system comprising:
one or more processors;
memory storing instructions, which, when executed by the one or more processors, causes the one or more processors to perform operations comprising:
receiving, by an online store, an indication that a client device received an instruction to launch an online store application from a media player application;
automatically receiving, by the online store, contextual data from the media player application, wherein the contextual data includes category information associated with media content currently being outputted by the media player application;
automatically identifying, by the online store and based on the contextual data, a store entry point identifier;
providing, by the online store, the store entry point identifier to the client device,
wherein the store entry point identifier comprises information for allowing the client device to navigate to a context-based entry point to the online store from the media player application; and
causing the client device to navigate to the context-based entry point to the online store from the media application player.

12. The system of claim 11 wherein the contextual data includes category information indicating media content displayed on the media player.

13. The system of claim 11 wherein the media content comprises at least one of music content; movie content, television show content and music video content.

14. The system of claim 11 wherein the contextual data includes artist information.

15. The system of claim 14 wherein the store entry point identifier links to media content associated with the artist information.

16. The system of claim 11 wherein the context-based entry point includes a link to return to the media player.

17. The system of claim 11 wherein the category information associated with the media content is substantially similar to the category information associated with the media displayed by the media player.

18. The system of claim 11 wherein the category information is derived from metadata associated with the media displayed by the media player.

\* \* \* \* \*